United States Patent [19]

Johannesen

[11] Patent Number: 4,471,798
[45] Date of Patent: Sep. 18, 1984

[54] FLUSHING CISTERNS

[75] Inventor: Erling M. Johannesen, Johannesburg, South Africa

[73] Assignee: Marley Plumbing (Proprietary) Limited

[21] Appl. No.: 390,652

[22] Filed: Jun. 21, 1982

[30] Foreign Application Priority Data

Jun. 25, 1981 [ZA] South Africa ............ 81/4310

[51] Int. Cl.³ .............. F16K 31/26; F16K 43/00; F16L 43/00
[52] U.S. Cl. .................. 137/135; 137/315; 137/393; 137/426; 137/428; 137/438; 137/443; 137/571; 4/366; 4/508; 251/214; 251/322; 251/323
[58] Field of Search ........... 137/135, 393, 428, 426, 137/438, 571, 315, 454.5, 443; 4/366, 395, 396, 398, 381, 508; 251/214, 322, 323

[56] References Cited

U.S. PATENT DOCUMENTS

| 545,348 | 8/1895 | Crawford et al. | 137/438 |
| 547,384 | 10/1895 | Rawe | 137/438 |
| 947,106 | 1/1910 | Kirk | 137/443 |
| 1,590,321 | 6/1926 | Sartakoff | 137/428 |
| 1,621,436 | 3/1927 | Sallada | 137/428 |
| 3,553,740 | 1/1971 | Fogg | 137/428 |
| 3,908,206 | 9/1975 | Grewing | 137/428 |

FOREIGN PATENT DOCUMENTS 137323 12/1901 Fed. Rep. of Germany ...... 137/438

Primary Examiner—George L. Walton
Attorney, Agent, or Firm—Scully, Scott, Murphy & Presser

[57] ABSTRACT

An auxiliary float chamber is provided for use in a cistern. A float operating in the chamber controls a valve allowing water into the cistern. In the floor of the chamber there is a syphonic tube. The chamber is held to the cistern wall by means of the valve which is of the type comprising a sliding tube sealing against a washer in a sealing cap so that the seal is not against the pressure of the inlet water. The auxiliary float chamber is mounted below the normal level of liquid in the cistern. As the cistern is discharged, the valve remains closed until water has drained from the auxiliary chamber. Water flowing into the cistern is thus not short-circuited through the discharge.

3 Claims, 6 Drawing Figures

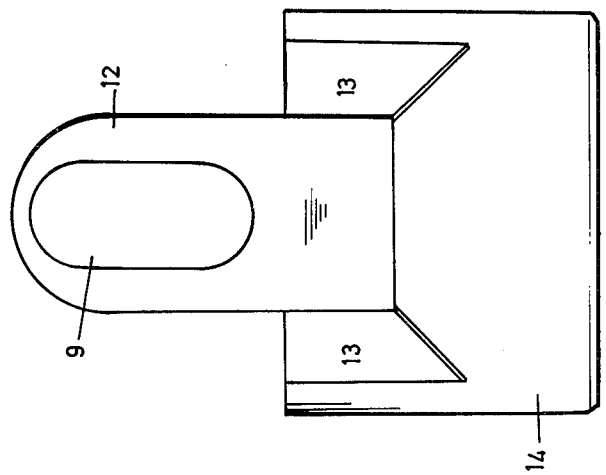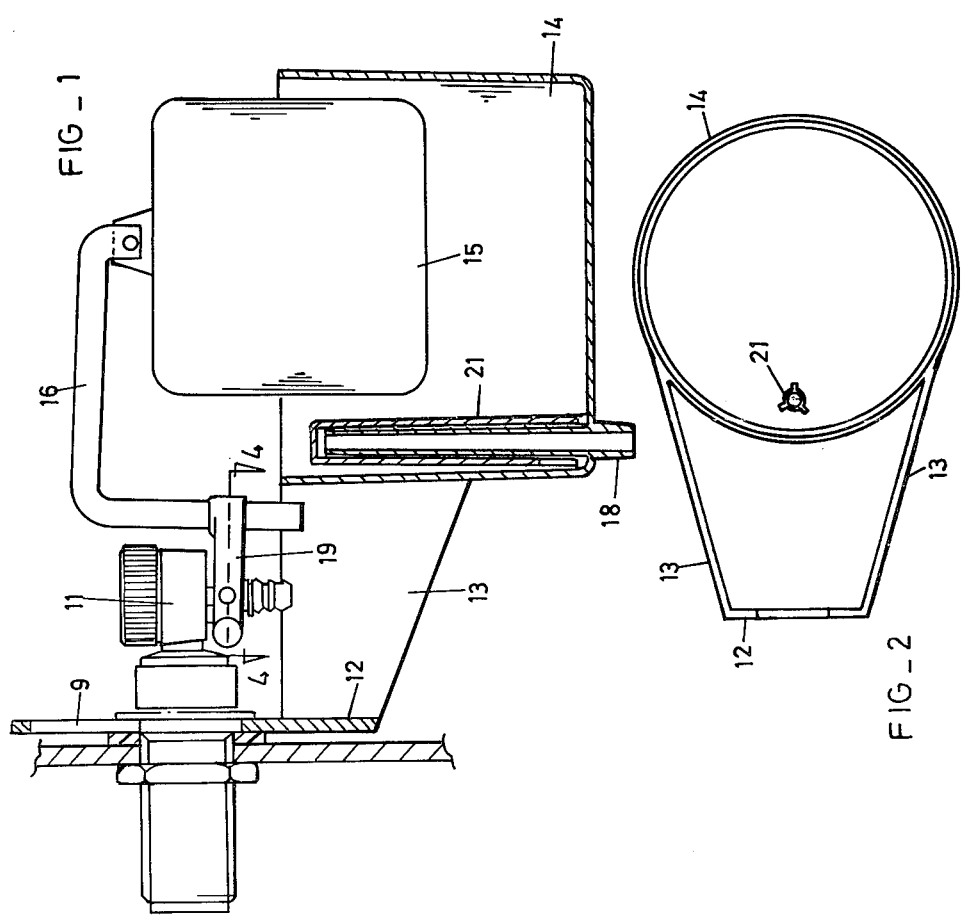

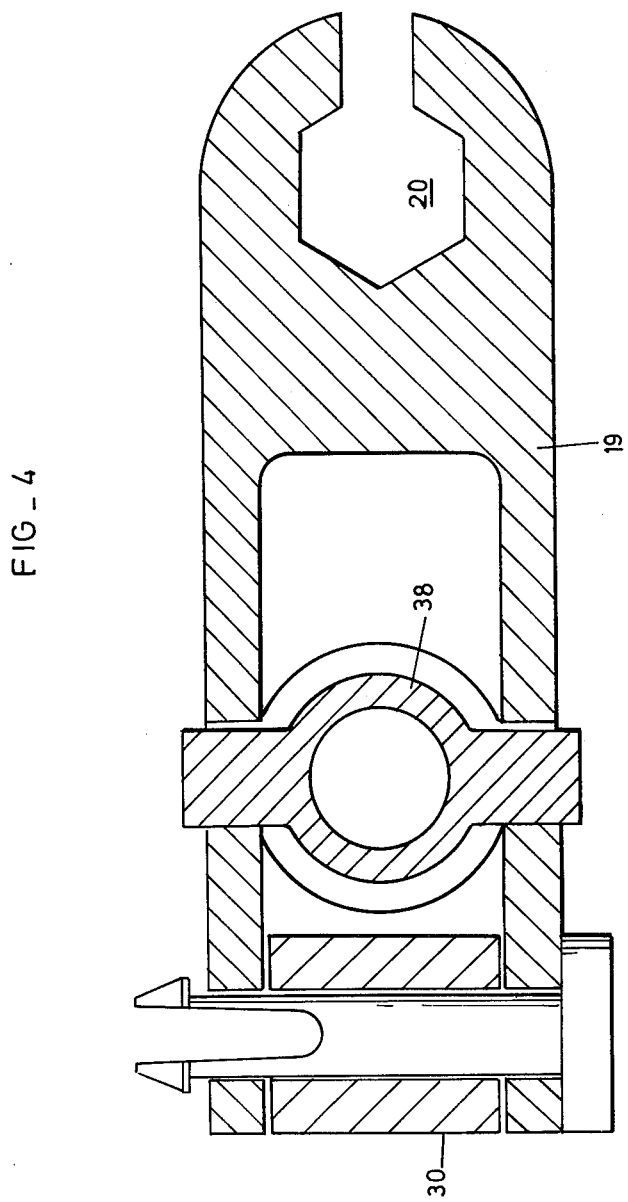

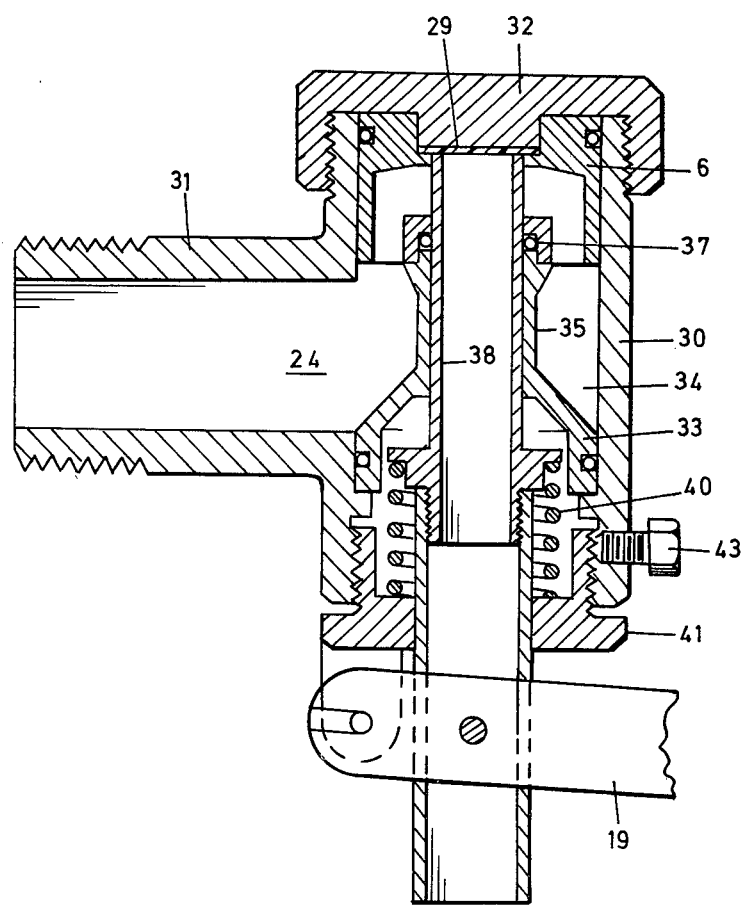
FIG_5

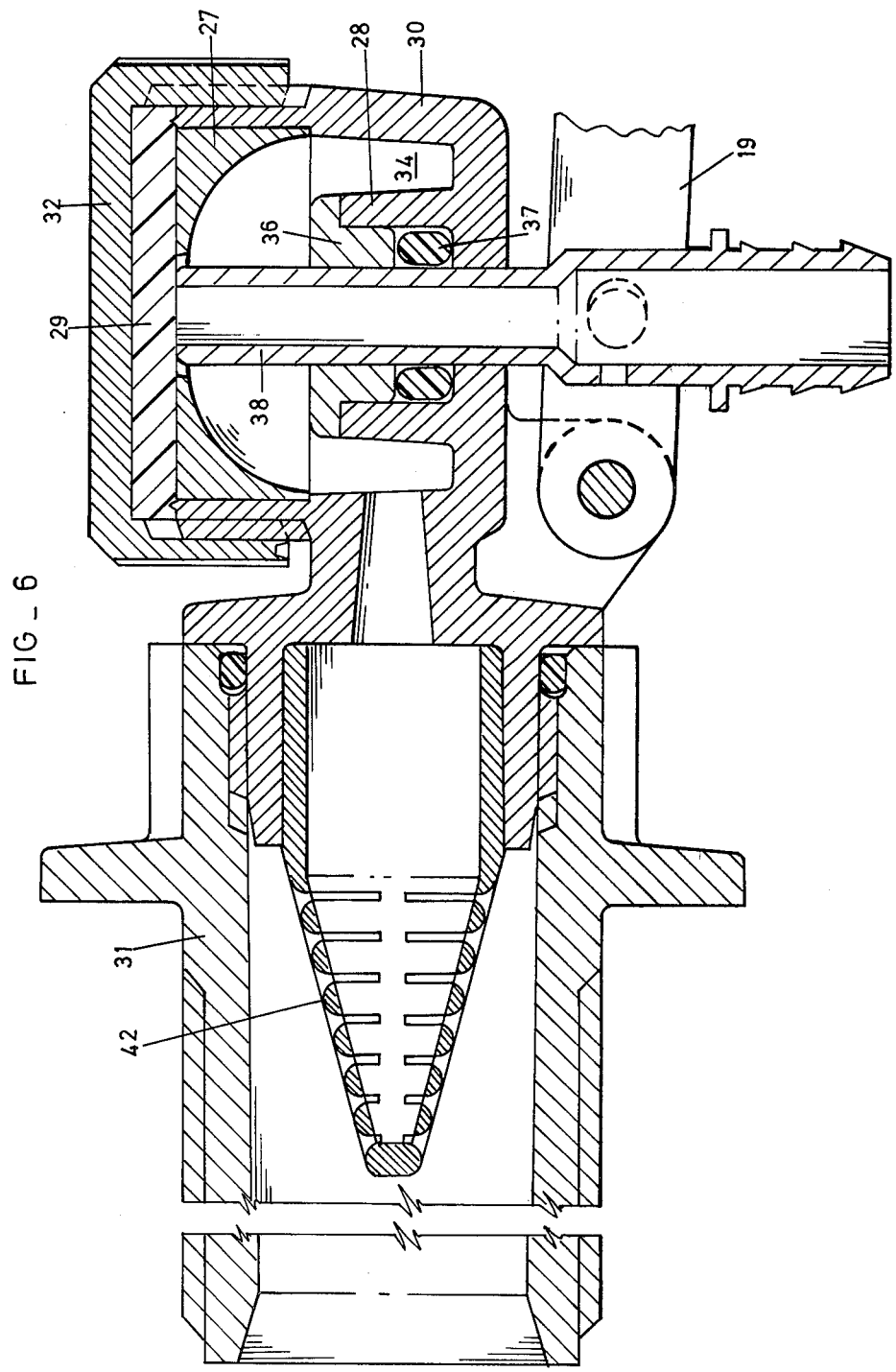
FIG_6

FLUSHING CISTERNS

BACKGROUND OF THE INVENTION

This invention relates to flushing cisterns.

A conventional flushing cistern comprises a tank to which water is fed through a float controlled inlet valve with a discharge valve which is actuated externally. The level of water in the cistern is controlled by the float. Theoretically only the volume defined by that level is discharged during flushing. However, in practice as soon as the float drops, the inlet valve opens and water flows from the inlet through the outlet until the outlet valve has passed through its closure cycle. At high water pressures the extra discharge could be considerable and is often wasteful.

It has already been proposed that a cistern be provided with an auxiliary float chamber with communication between the main body of the cistern and the auxiliary chamber taking place via a syphonic tube. The result is that the inlet valve remains closed until there is discharge from the auxiliary float chamber through the syphonic tube. As the latter discharge is arranged to be quick, the flow of inlet water during the period of the outlet is open, is minimised to a large extent. Backflow was intended to be through the syphonic tube, but this was seldom effective.

The auxiliary float chamber as previously proposed is difficult to manufacture and install. An object of the invention is to provide an auxiliary float chamber which will be easy to make and install.

SUMMARY OF THE INVENTION

For use in a cistern the invention provides an auxiliary float chamber comprising an open-topped container with a syphonic tube in its base, for drawing water out of the container when the level in the cistern drops to a certain level, an angled bracket extending from the container with an upstanding flange which is holed, so that the auxiliary float chamber can be secured in the cistern by means of a float controlled inlet valve.

The float chamber of the invention is preferably used with a float operated valve of the kind in which the lever arm carrying the float does not operate against the inlet pressure. The lever arm may thus be short and the chamber correspondingly small.

In one such valve a valve orifice is formed in a movable member with a flow passage in the member, while the member is caused to seat on an abutment to prevent flow into the orifice and along the flow passage, the lever arm being connected to the movable member.

A preferred form of valve comprises:

a valve chamber, first and second axially aligned openings to the valve chamber, a third opening to the valve chamber constituting an inlet, a detachable cap closing the first opening, a sealing washer detachably carried by the cap, a tube constituting the movable member and arranged to move axially in the second opening between a first position in which its inner mouth abuts the sealing washer and positions in which fluid in the chamber may flow out of the valve chamber along the tube, a sealing ring around the tube preventing leakage of fluid from the valve chamber along the outside of the tube, and a detachable locating element holding the sealing ring in position, which element can be replaced through the first opening to allow for replacement of the sealing ring.

DESCRIPTION OF THE DRAWINGS

FIG. 1 is a side view partly in section of an auxiliary float chamber installed by means of a float controlled valve;

FIG. 2 is a plan view of the float chamber;

FIG. 3 is a side view of the float chamber;

FIG. 4 is an enlarged section on the line 4—4 in FIG. 1;

FIG. 5 is a section through one form of valve suitable for use in the installation of FIG. 1; and FIG. 6 is a section through another form of valve also so suitable.

DESCRIPTION OF EMBODIMENTS

In FIG. 1 a cistern wall 10 is shown fitted with a float controlled valve 11 of the type described below with reference to FIGS. 5 or 6.

The valve 11 holds in position an auxiliary float chamber 14 by means of a bracket having a back flange 12 and side flanges 13. The valve 11 is secured to the wall 10 through a slot 9 in the back flange 12.

A float 15 is secured to a cranked extension arm 16 of a lever arm 19 actuating the valve 11.

The position of the rim of the chamber 14 may be adjusted by positioning the valve at a suitable position over the slot 9. As shown it is at its highest level. Any downward adjustment also requires downward adjustment of the float 15. To achieve this the cranked end of the extension arm 16, which is of hexagonal section, is a tight fit in a split hole 20 of a complemental shape as shown in FIG. 4.

In the base of the chamber 14 there is a syphon composed of an inner leg 18 projecting to a suitable level below that base and an outer sheath 21 covering, but spaced from the leg 18 and spaced from the base of the chamber 18 to allow liquid to flow up through the space between the sheath 21 and the leg 19 and down through the leg 18.

The operation of the device thus far described is as follows. Assuming the cistern to be filled to the desired level of the chamber 14 full of water, the valve 11 will be closed. If the cistern now be caused to discharge its contents, water will flow out of the cistern, but the valve 11 will not yet open. As soon as the lower tip of the leg 18 is uncovered, syphonic action will start and the chamber 14 will empty so that the float 15 sinks and the valve 11 opens to fill the cistern once more. Eventually water will flow over the rim of the chamber 14 to close the valve 11 once more.

The length of the arm 19,16 and the size of the chamber 14 as illustrated is only possible if a valve of the type described below and requiring minimal closing forces be used. If a conventional type of valve be used, the chamber 14 or the sides 13 or both will have to be extended so as to accommodate the length of the arm required and the size of the float required to effect closure of the valve.

Two valves suitable for the embodiment of FIGS. 1 to 4 are illustrated in FIGS. 5 and 6.

In FIG. 5 there is a cylindrical valve body 30 provided with an inlet 31. The top of the body 30 is closed by means of a screw cap 32. The cap 32 holds in position an insert 33 which seals off the bottom of the chamber 34 inside the body 30 and provides a centrally holed boss 35, and a locating member 36 holding in position an O-ring 37.

A tube 38 constitutes the valve member and slides inside the boss 35 and is sealed on its outside by means of the O-ring 37. Between the cap 32 and the member 36 there is a washer 29 against which the inner mouth of the tube 38 seals on closure.

It will be seen that in the illustrated position there can be no flow from the chamber 34 to the interior of the tube 38. If the tube 38 is moved down, flow from the chamber 34 takes place through the tube 38.

In this embodiment the tube is moved by means of the lever arm 39 of a float (not shown). Upward movement of the tube 38 is assisted by means of a spring 40, but this spring is not essential to the working of the device. The spring 40 is held in place by means of a cap 41 on which the lever arm 19 is also provided as shown. A grub screw 43 holds the cap 31 in any angular position to which it has been adjusted to give the float a free moving action.

Opening of the valve of FIG. 5 is resisted only by the spring 40 (which need not be there) while closure is resisted only by the forces of gravity. A relatively small float and a short lever arm 19 can effect closure of almost any size valve. In the closed position, the force holding the mouth of the tube 38 against the washer 29 is not dependent on the pressure inside the chamber 34.

In FIG. 6 the washer 29 not only acts as a seat but also seals the cap 32 to the body 30. Also there is no insert to provide a centrally holed boss, but the tube 38 passes through the floor of the body 30 which also provides the pivot point for the lever arm 19. A screen 42 is provided in the inlet 31.

In this case the O-ring 37 is held in position by means of a locating element which is a press fit in a holed boss 28 upstanding from the floor of the body 30. The washer 29 is replaced merely by removing the cap 32, while with the cap 32 off the element 36 may be lifted out and the O-ring 37 replaced, if this is necessary.

An additional insert 27 is provided to support the washer 29 against possible sagging.

I claim:

1. A cistern flushing combination including: an auxiliary float chamber comprising an open-topped container with a syphonic tube in its base for drawing water out of the container when the water in the cistern drops below a certain level; an inlet valve for controlling the replenishment of water in the cistern from a water source and comprising a valve chamber, a transverse inlet to the chamber constituted by an inlet conduit connectable to the water source, an outlet from the chamber which extends downwardly in use into the cistern at right angles to the inlet conduit, a sealing washer, a tube movable axially in the outlet between closed and open positions in which it seats on the washer and is spaced from the washer respectively, a sealing ring about the tube preventing leakage past the outside of the tube, an access opening to the chamber, and a cap closing the access opening, removal of the cap permitting replacement of both the sealing washer and the sealing ring; a float for floating at the surface of the water in the container, a lever arm connecting the tube to the float to move the tube in response to movement of the float; and an angled bracket integral with and extending from the auxiliary float chamber, said bracket further including a flange which can be clamped adjustably to a wall of the cistern to support the auxiliary float chamber at a desired elevation in the cistern and being received by the inlet valve with the inlet conduit of the valve passing through aligned holes in the wall and the flange.

2. The combination of claim 1, in which the hole in the flange is a slot.

3. The combination of claim 1 or claim 2, in which the lever arm comprises a short length connected pivotally to a fixed part of the valve and to the tube and a cranked extension carrying the float and connection adjustably to the short length.

* * * * *